(12) United States Patent  
Nakamura et al.

(10) Patent No.: US 12,031,946 B2  
(45) Date of Patent: Jul. 9, 2024

(54) SENSOR DEVICE

(71) Applicant: KYOCERA Corporation, Kyoto (JP)

(72) Inventors: Shinnosuke Nakamura, Kyoto (JP); Atsuomi Fukuura, Kyoto (JP); Hiroshi Katta, Kashihara (JP)

(73) Assignee: Kyocera Corporation, Kyoto (JP)

( * ) Notice: Subject to any disclaimer, the term of this patent is extended or adjusted under 35 U.S.C. 154(b) by 289 days.

(21) Appl. No.: 17/614,304

(22) PCT Filed: May 29, 2020

(86) PCT No.: PCT/JP2020/021450  
§ 371 (c)(1),  
(2) Date: Nov. 24, 2021

(87) PCT Pub. No.: WO2020/241867  
PCT Pub. Date: Dec. 3, 2020

(65) Prior Publication Data  
US 2022/0229019 A1 Jul. 21, 2022

(30) Foreign Application Priority Data

May 31, 2019 (JP) ................................. 2019-103238

(51) Int. Cl.  
G01N 29/02 (2006.01)  
G01N 29/24 (2006.01)

(52) U.S. Cl.  
CPC ....... *G01N 29/022* (2013.01); *G01N 29/2462* (2013.01); *G01N 2291/0423* (2013.01); *G01N 2291/0426* (2013.01)

(58) Field of Classification Search  
CPC ............. G01N 29/022; G01N 29/2462; G01N 2291/0423; G01N 2291/0426; G01N 29/2437; G01N 2291/0255; G01N 29/041  
See application file for complete search history.

(56) References Cited

U.S. PATENT DOCUMENTS 5,527,711 A 6/1996 Tom-Moy et al.  
7,193,352 B1 * 3/2007 Ballato ................ G01N 29/022  
310/320

(Continued)

FOREIGN PATENT DOCUMENTS

EP 3006933 A1 4/2016  
JP H0646496 A * 2/1994  
(Continued)

*Primary Examiner* — Francis C Gray  
(74) *Attorney, Agent, or Firm* — Procopio, Cory, Hargreaves & Savitch LLP

(57) ABSTRACT

A sensor device includes a substrate having a substrate surface, a first IDT electrode, a second IDT electrode, and a waveguide. The first IDT electrode and the second IDT electrode are positioned on the substrate surface. The waveguide is positioned on the substrate surface and between the first IDT electrode and the second IDT electrode. At least one of the first IDT electrode and the second IDT electrode includes a reference electrode and a signal electrode each including a plurality of electrode fingers, the plurality of electrode fingers being arranged in a juxtaposed manner in one direction. A distance between the at least one of the first IDT electrode and the second IDT electrode and the waveguide is shorter than an interval between the reference electrode and the signal electrode in the one direction.

15 Claims, 7 Drawing Sheets

(56) References Cited

U.S. PATENT DOCUMENTS

| | | |
|---|---|---|
| 9,678,042 B2 | 6/2017 | Kogai et al. |
| 11,029,288 B2 | 6/2021 | Kobayashi |
| 2014/0144237 A1 | 5/2014 | Komatsu et al. |

FOREIGN PATENT DOCUMENTS

| | | | |
|---|---|---|---|
| JP | H7-209166 A | | 8/1995 |
| JP | 2008-122105 A | | 5/2008 |
| JP | 2015210080 A | * | 11/2015 |
| JP | 2016184805 A | * | 10/2016 |
| JP | 2017-223699 A | | 12/2017 |
| JP | 6558029 B2 | * | 8/2019 |
| WO | 2013/065789 A1 | | 5/2013 |
| WO | 2019/097769 A1 | | 5/2019 |

* cited by examiner

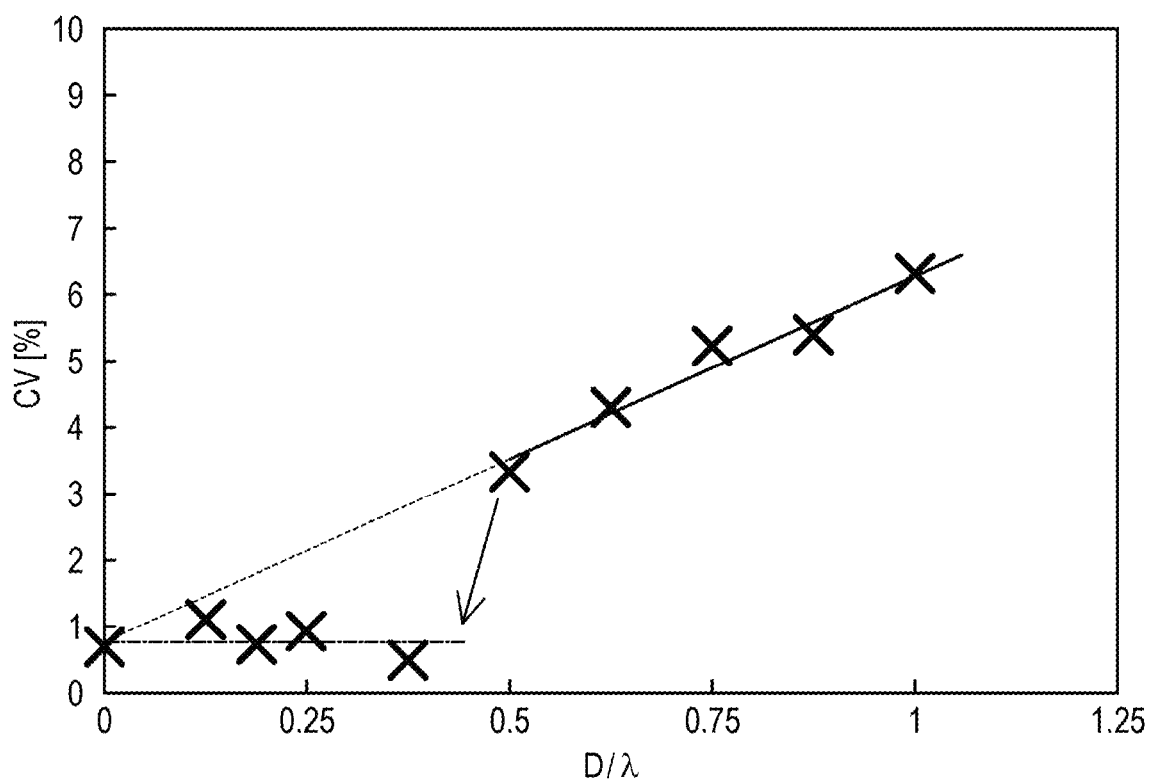

SENSOR DEVICE

CROSS-REFERENCES TO RELATED APPLICATIONS

The present application claims priority of Japanese Patent Application No. 2019-103238 filed in Japan on May 31, 2019, the entire disclosure of which is hereby incorporated by reference.

TECHNICAL FIELD

The present disclosure relates to a sensor device.

BACKGROUND ART

An elastic wave sensor including a sensitive film having adsorptivity to a measurement target substance on a propagation path of a surface acoustic wave is known (for example, see PTL 1).

CITATION LIST

Patent Literature

PTL 1: Japanese Unexamined Patent Application Publication No. 2008-122105

SUMMARY OF INVENTION

A sensor device according to an embodiment includes a substrate having a substrate surface, a first IDT electrode, a second IDT electrode, and a waveguide. The first IDT electrode and the second IDT electrode are positioned on the substrate surface. The waveguide is positioned on the substrate surface and between the first IDT electrode and the second IDT electrode. At least one of the first IDT electrode and the second IDT electrode includes a reference electrode and a signal electrode each including a plurality of electrode fingers, the plurality of electrode fingers being arranged in a juxtaposed manner in one direction. A distance between the at least one of the first IDT electrode and the second IDT electrode and the waveguide is shorter than an interval between the reference electrode and the signal electrode in the one direction.

BRIEF DESCRIPTION OF DRAWINGS

FIG. 7 is a graph illustrating an example of measured data of a relationship between a distance between the IDT electrodes and the waveguide and a coefficient of variation of a sensitivity of the sensor device.

DESCRIPTION OF EMBODIMENTS

<Functions of SAW Sensor>

Figure 1:
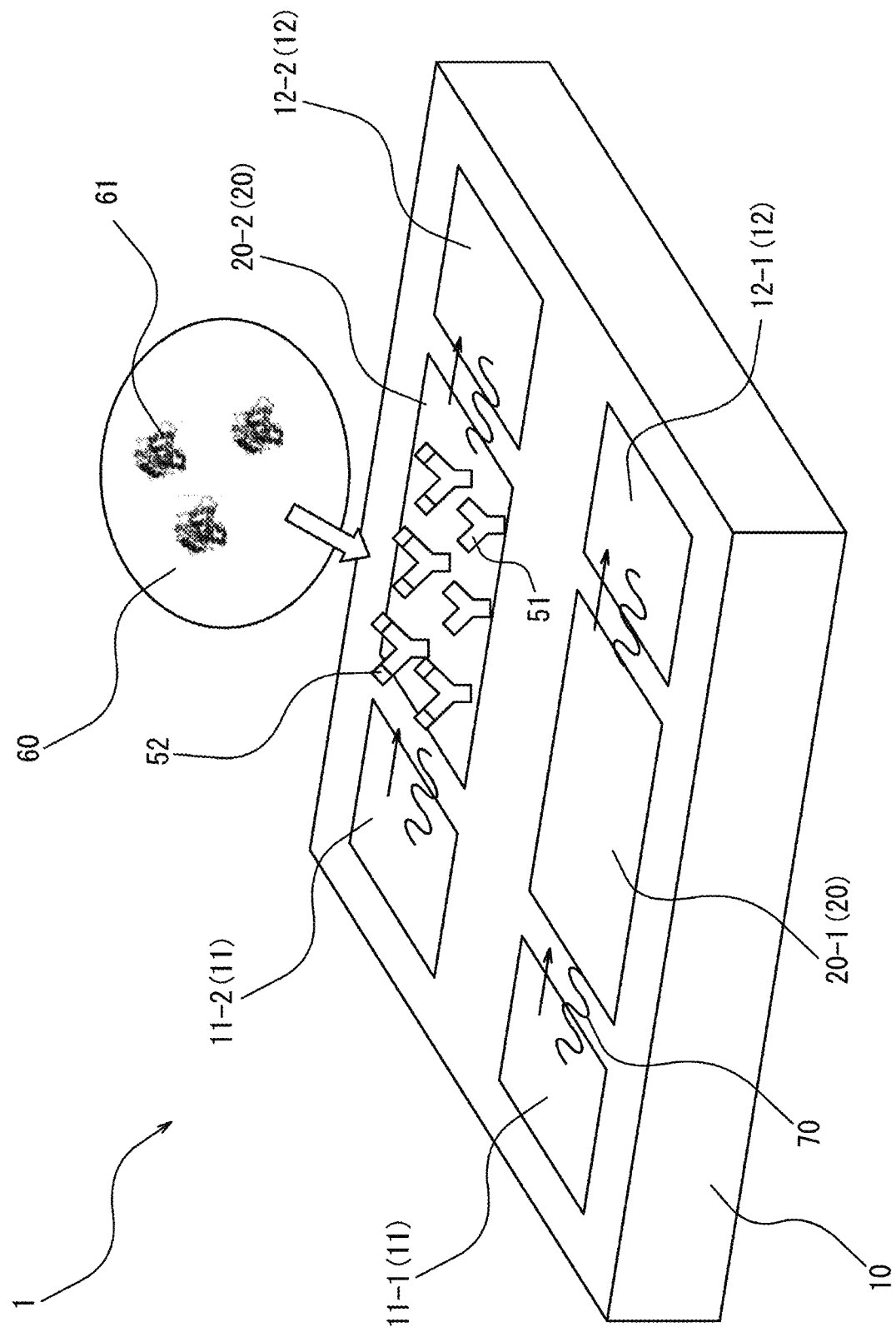
FIG. 1 is a schematic diagram of a sensor device according to an embodiment.

FIG. 1 is a schematic diagram illustrating the configuration of a sensor device 1 according to an embodiment. The sensor device 1 according to an embodiment includes a substrate 10, a first IDT (interdigital transducer) electrode 11, a second IDT electrode 12, and a waveguide 20. The sensor device 1 functions as a SAW sensor that can detect a detection target on the basis of a change in the propagation characteristics of a surface acoustic wave (SAW) 70.

The sensor device 1 inputs an electric signal to the first IDT electrode 11. The first IDT electrode 11 can transmit the surface acoustic wave 70 that propagates along the substrate 10 on the basis of the input electric signal. The second IDT electrode can receive the surface acoustic wave 70 and can convert the surface acoustic wave 70 into an electric signal.

In the sensor device 1 according to an embodiment, the first IDT electrode 11, the second IDT electrode 12, and the waveguide 20 are positioned on the substrate 10. In addition, the waveguide 20 is positioned between the first IDT electrode 11 and the second IDT electrode 12. Thus, the propagation path of the surface acoustic wave 70 includes a surface of the substrate 10 and the waveguide 20 positioned on the surface of the substrate 10. That is, the SAW 70 propagates from the first IDT electrode 11 to the second IDT electrode 12 through the waveguide 20. In other words, the waveguide 20 is positioned in part of the propagation path of the SAW 70. The electric signal herein is an electric signal for allowing the sensor device 1 to function. The electric signal may include, for example, a voltage signal, a current signal, and the like.

Note that, although omitted from the illustration, the sensor device 1 includes a control unit that can control the entire sensor device 1, such as the input/output of an electric signal and various calculations based on the electric signal. The control unit may be configured by a known method of the related art.

The SAW 70 propagates with predetermined propagation characteristics. The propagation characteristics of the SAW 70 are determined on the basis of the state of the propagation path. The sensor device 1 can detect a change in the state of the propagation path by measuring a change in the propagation characteristics of the SAW 70. The propagation characteristics include, for example, the propagation velocity, phase, amplitude, period, wavelength, and the like of the surface acoustic wave 70.

The sensor device 1 according to an embodiment can detect a detection target that is present in the propagation path on th basis of the measured phase of the SAW 70.

The phase of the transmitted SAW 70 changes, for example, depending on the state of the propagation path. Specifically, for example, if a substance is present in the propagation path, depending on a change in the mass, viscosity, density, or the like of the substance, the propagation velocity of the SAW 70 changes. In this case, in the surface acoustic wave 70 received by the second IDT electrode 12, a difference is generated in the phase in accordance with a difference in the propagation velocity from the SAW 70 transmitted by the first IDT electrode 11. Thus, on the basis of the magnitude of the phase difference of the SAW 70, the sensor device 1 can measure the mass, viscosity, density, or the like of the substance that is the detection target present in the propagation path.

In this case, a calibration curve that specifies a relationship between the phase difference and the mass or the like of the substance that is the detection target may be prepared in advance. Specifically, by measuring a known substance having a known mass or the like and by measuring the phase difference in this case, the sensor device 1 acquires the relationship between the known mass or the like and the measured phase difference as the calibration curve. On the basis of the calibration curve, the sensor device 1 can convert the phase difference into the mass or the like of the substance that is the detection target present in the propagation path.

The waveguide 20 is a region that comes into contact with a specimen 60 in the propagation path of the SAW 70. In the waveguide 20, a substance (reactive substance) that can react with detection target in the specimen 60 is positioned. Detection targets herein are, for example, antibodies 51, antigens 61, and substrates. In this case, respective reactive substances are, for example, antigens 61, antibodies 51, and enzymes. In addition, for example, if the detection target is the antigens 61, the reactive substance may be the same antigens 61 as the detection target or may be an analogue having an epitope that is similar to that of the detection target. In this case, the detection target and antibodies 51 are made to react with each other in advance, and then unreacted antibodies 51 are made to react with the antigens 61 that are the reactive substance or with an analogue, and thereby, the detection target can be detected indirectly. Note that combinations of the detection target and the reactive substance are not limited to these examples as long as the propagation velocity of the SAW 70 can be changed in the waveguide 20 to generate a phase difference. For example, if a specific molecule is wished to be a detection target, an aptamer that is designed to be bound to the specific molecule may be used as the reactive substance. The detection target of the sensor device 1 according to an embodiment is the antigens 61, and the reactive substance is the antibodies 51.

The reactive substance may be immobilized on the waveguide 20. In this case, the waveguide 20 may be formed of, for example, Au, Pt, Ti, or the like. Note that the waveguide 20 is not limited to these examples as long as it is a metal that can immobilize the reactive substance on the substrate 10. The waveguide 20 may also be formed of any given material that has oxidation resistance and corrosion resistance against contact with the specimen 60. In addition, the reactive substance may be directly immobilized on the surface of the substrate 10. In the sensor device 1 according to an embodiment, the waveguide 20 is formed of Au.

The sensor device 1 according to an embodiment includes a first channel including a pair of a first IDT electrode 11-1 and a second IDT electrode 12-1 and a waveguide 20-1. The sensor device 1 includes a second channel including a pair of a first IDT electrode 11-2 and a second IDT electrode 12-2 and a waveguide 20-2. Note that the number of channels of the sensor device 1 is not limited to two and may be one, or three or more.

The sensor device 1 detects the phase difference of the SAW 70 in each of the first channel and the second channel. The phase differences detected in the first channel and the second channel will be called a first phase difference and a second phase difference, respectively.

The waveguide 20-2 in the second channel has the antibodies 51 on a surface thereof. The antibodies 51 react with specific antigens 61 that are the detection target. By reacting with the antigens 61, the antibodies 51 can be bound to the antigens 61 to form complexes 52. That is, after the specimen 60 is supplied, on the surface of the waveguide 20-2 in the second channel, both the antibodies 51 and the complexes 52 may be present. The complexes 52 on the waveguide 20-2 in the second channel may be ones generated through the reaction between the antibodies 51 that the surface of the waveguide 20 has had and the antigens 61 included in the specimen 60 that has been supplied to the waveguide 20. On the other hand, the waveguide 20-1 in the first channel has no antibodies 51 on a surface thereof.

The complexes 52 include the antigens 61. That is, by the antibodies 51 bound to the antigens 61, the mass of the antigens 61 is further added to the substrate 10. In addition, by the antibodies 51 bound to the antigens 61, the density in the vicinity of the surface of the waveguide 20-2 increases. Thus, as the proportion of the complexes 52 in the waveguide 20-2 increases, the change in the state of the propagation path in the second channel increases. That is, in accordance with the change in the proportion of the complexes 52, the propagation velocity of the SAW 70 that propagates through the waveguide 20-2 decreases, and thus, the phase difference to be detected also increases.

The antibodies 51 may be replaced with aptamers. The aptamers include nucleic acid molecules, peptides, and the like that specifically bind to specific molecules that are the detection target. When the waveguide 20 has aptamers on the surface thereof, by the aptamers bound to the specific molecules, the mass of the specific molecules is further added to the substrate 10. In addition, the density in the vicinity of the surface of the waveguide 20 increases. The antibodies 51 may also be replaced with enzymes. For example, when the enzymes form reactants by reacting with the substrate of the detection target, by the reactants deposited on the waveguide 20, the mass of the reactants is further added to the substrate 10. In addition, the density in the vicinity of the surface of the waveguide 20 increases. The antibodies 51 are not limited to these examples and may be replaced with another element that can react with a substance of the detection target or that can bind to a substance of the detection target.

The first channel of the sensor device 1 can allow the SAW 70 to propagate through the waveguide 20 and can detect the first phase difference. The second channel of the sensor device 1 can allow the SAW 70 to propagate through the waveguide 20 including the antibodies 51 or the complexes 52 and can detect the second phase difference. The second phase difference is a phase difference in accordance with the proportion of the complexes 52 included in the waveguide 20.

The sensor device 1 can use the first phase difference as a reference value. That is, the sensor device 1 may correct the result of detection by subtracting the first phase difference from the second phase difference. Thus, the sensor device 1 can reduce effects of noise, such as variation of the phase differences based on the temperature characteristics of the substrate 10. On the basis of the corrected result of detection of the second phase difference, the sensor device 1 may calculate the amount, concentration, density, or the like of the antigens 61 included in the specimen 60. In this case, a calibration curve that specifies the relationship between the second phase difference and the amount, concentration, density, or the like of the antigens 61 may be prepared in advance. On the basis of the calibration curve, the sensor device 1 may covert the second phase difference into the amount, concentration, density, or the like of the antigens 61. The specimen 60 may include, for example, human body fluids such as blood and urine. The specimen 60 is not limited to this and may include any appropriate chemical substance. The specimen 60 may be preprocessed before the specimen 60 is introduced into a channel of the sensor device 1.

The reaction through which the antibodies 51 bind to the antigens 61 to become the complexes 52 progresses with a predetermined reaction velocity. Accordingly, in accordance with the elapsed time after introduction of the specimen 60 into the channel, the proportion of the complexes 52 included in the waveguide 20 increases. As a result, the phase difference that the sensor device 1 detects in the channel increases in accordance with the elapsed time.

The phase difference becomes constant when the reaction between all of the antigens 61 in the specimen 60 and the antibodies 51 finishes. Thus, for example, the sensor device 1 can calculate the phase difference after an elapse of a sufficiently long time since the introduction of the specimen 60 into the channel, the time being necessary to finish the reaction between the antibodies 51 and the antigens 61. On the basis of the calculated phase difference, the sensor device 1 may calculate the amount of the antigens 61. In addition, since the phase difference increases at a constant rate, the sensor device 1 may calculate the amount of the antigens 61 on the basis of a phase difference after an elapse of a certain time since the start of detection. In addition, when the change in the phase difference is regarded as a time function, the sensor device 1 may calculate the amount of the antigens 61 on the basis of the inclination of a function curve after an elapse of a certain time since the start of detection.

The sensor device 1 may detect a period of time from input of an electric signal to the first IDT electrode 11 to detection of the electric signal by the second IDT electrode 12. The sensor device 1 may detect a change in the state of the vicinity of the surface of the waveguide 20 by detecting a change in the propagation velocity by calculating the propagation velocity on the basis of the period of time from input of the electric signal to detection of the electric signal and the distance between the electrodes. Note that the sensor device 1 may detect, as propagation characteristics, a change in the amplitude of the SAW 70 or a plurality of characteristics.

<Configuration of SAW Sensor>

Figure 2:
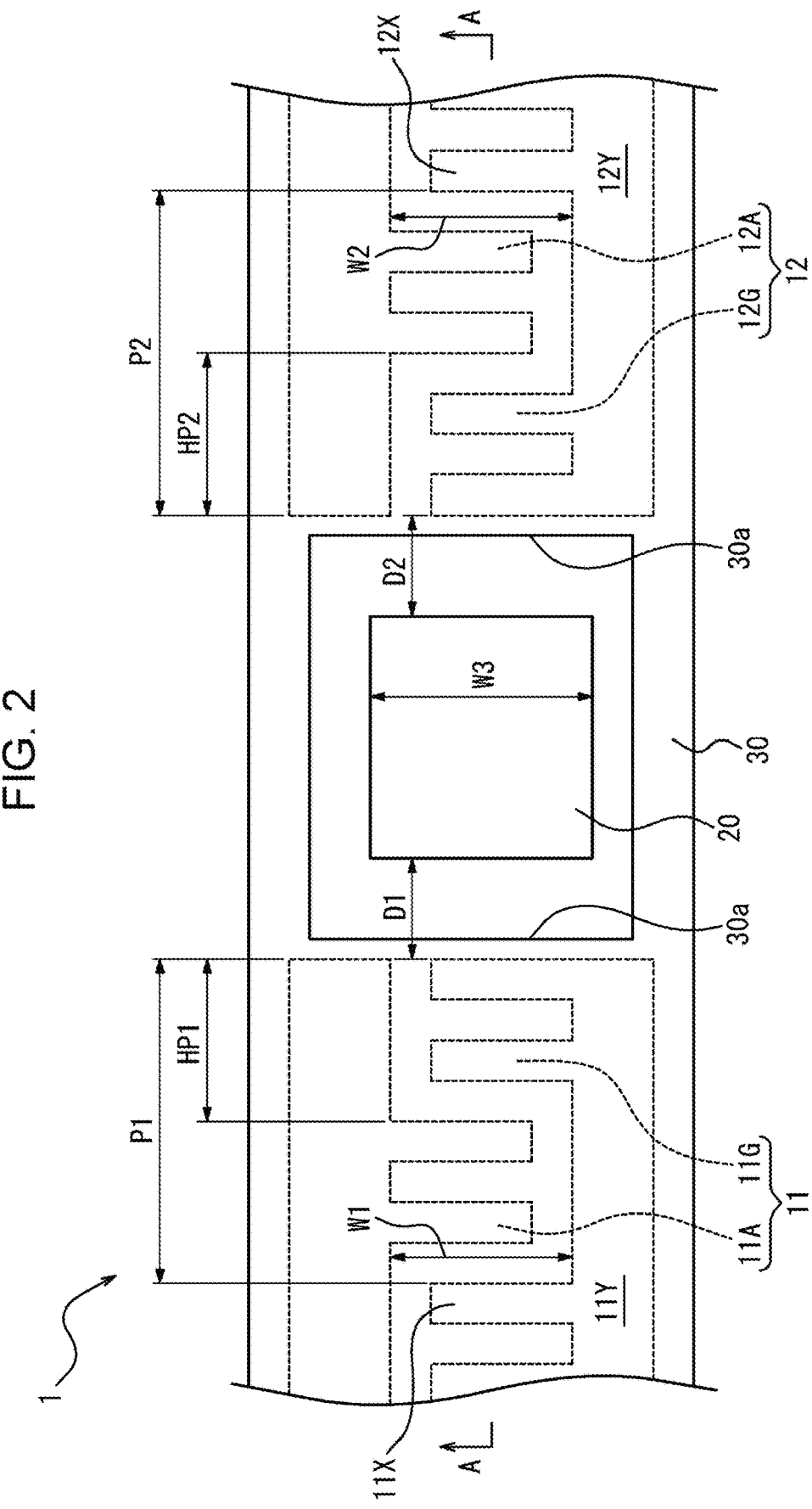
FIG. 2 is a plan view of the sensor device according to an embodiment.
Figure 3:
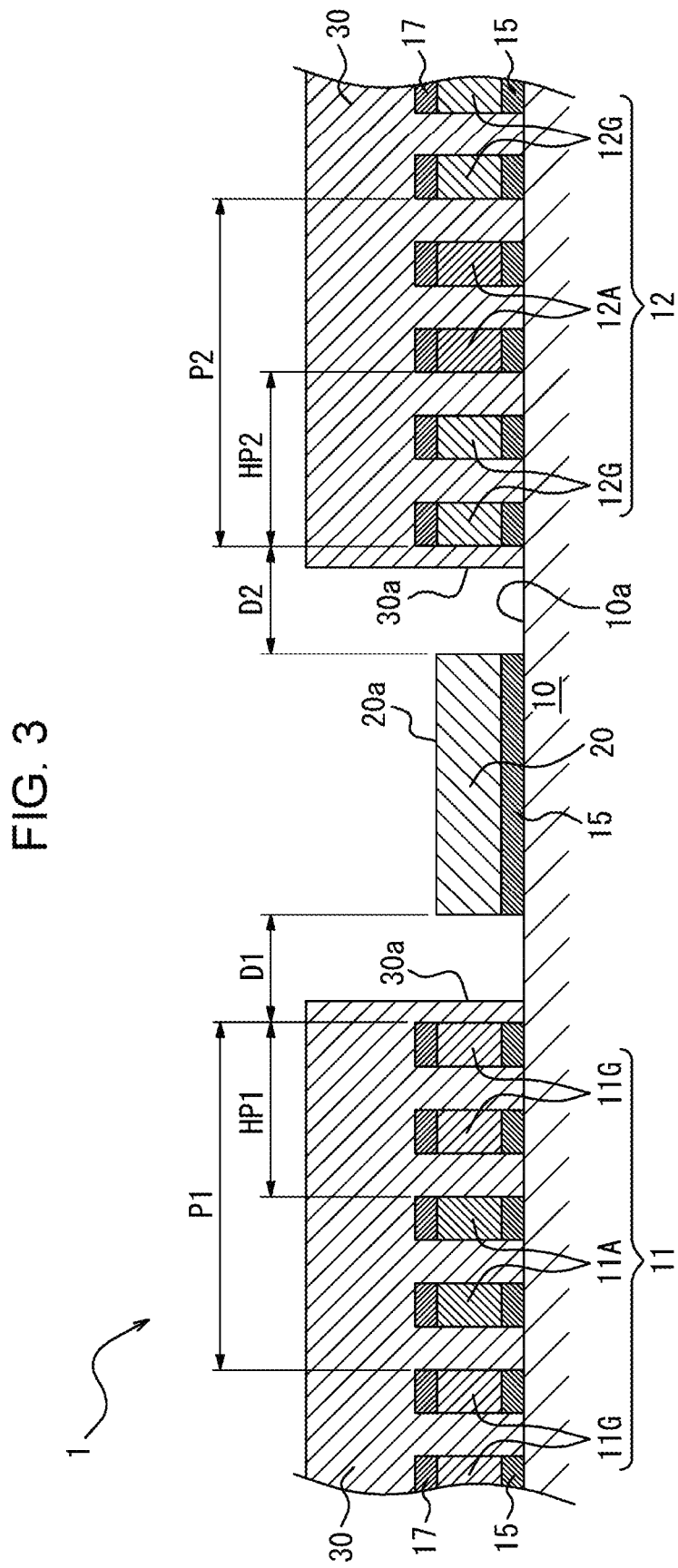
FIG. 3 is a sectional view taken along A-A of FIG. 2.

Referring to FIGS. 2 and 3, each element of the sensor device 1 will be described in detail. As described above, the sensor device 1 includes the substrate 10, the first IDT electrode 11, the second IDT electrode 12, and the waveguide 20. The sensor device 1 further includes a protective film 30.

The substrate 10 has a substrate surface 10a. The substrate 10 is, for example, a plate-like member. The substrate 10 may be formed of, for example, quartz, lithium tantalate, lithium niobate, or the like. Note that the substrate 10 is not limited to these examples and may be formed of a material that causes a piezoelectric phenomenon. In an embodiment, the substrate 10 is formed of quartz.

The first IDT electrode 11 and the second IDT electrode 12 are positioned on the substrate surface 10a. The first IDT electrode 11 and the second IDT electrode 12 are, for example, formed as a layer. The first IDT electrode 11 and the second IDT electrode 12 may be formed of, for example, a metal alone, such as gold (Au) or aluminum (Al). The first IDT electrode 11 and the second IDT electrode 12 may also be formed of two or more materials, such as an alloy (AlCu) of aluminum (Al) and copper (Cu). Note that the material for forming the first IDT electrode 11 and the second IDT electrode 12 are not limited to these examples as long as the material functions as an electrode. In an embodiment, the first IDT electrode 11 and the second IDT electrode 12 are formed of Au.

On a side surface of the I-th DT electrode 11, the upper end of the side surface may be positioned in an inner direction of the first IDT electrode 11 than the lower end of the side surface. In addition, the side surface of the first IDT electrode 11 may be tilted. On a side surface of the second IDT electrode 12, the upper end of the side surface may be positioned in an inner direction of the second IDT electrode 12 than the lower end of the side surface. In addition, side surface of the second IDT electrode 12 may be tilted. The upper surface of the first IDT electrode 11 may be smaller than the lower surface of the first IDT electrode 11. The upper surface of the second IDT electrode 12 may be smaller than the lower surface of the second IDT electrode 12. In addition, when the side surface of the first IDT electrode 11 is tilted, a side-surface region may be smaller than an upper-surface region in a top view of the first IDT electrode 11. In addition, when the side surface of the second IDT electrode 12 is tilted, a side-surface region may be smaller than an upper-surface region in a top view of the second IDT electrode 12.

The first IDT electrode 11 may have a substrate-side close-contact layer 15 between the first IDT electrode 11 and the substrate surface 10a, and the second IDT electrode 12 may have the substrate-side close-contact layer 15 between the second IDT electrode 12 and the substrate surface 10a. The first IDT electrode 11 and the second IDT electrode 12 may have a protective-film-side close-contact layer 17 between the protective film 30 and surfaces thereof on a side opposite to a side facing the substrate surface 10a. Each of the first IDT electrode 11 and the second IDT electrode 12 can be stably in close contact with the substrate 10 and the protective film 30 with the substrate-side close-contact layer 15 and the protective-film-side close-contact layer 17 interposed therebetween. The substrate-side close-contact layer 15 and the protective-film-side close-contact layer 17 may be formed of, for example, titanium (Ti), chromium (Cr), or the like. The substrate-side close-contact layer 15 and the protective-film-side close-contact layer 17 may also be formed of mutually different materials. Specifically, the substrate-side close-contact layer 15 may be Ti, and the protective-film-side close-contact layer 17 may be Cr. Note that the substrate-side close-contact layer 15 and the protective-film-side close-contact layer 17 are not limited to these examples as long as the first IDT electrode 11 and the second IDT electrode 12 can be in close contact with the substrate 10 and the protective film 30. In an embodiment, the substrate-side close-contact layer 15 and the protective-film-side close-contact layer 17 are each formed of Ti.

The first IDT electrode 11 includes a first reference electrode 11G and a first signal electrode 11A to which voltage is applied. The first reference electrode 11G and the first signal electrode 11A are positioned to face each other on the substrate 10a. The sensor device 1 applies a voltage signal between the first reference electrode 11G and the first signal electrode 11A to generate the SAW 70 in the first IDT electrode 11. The first reference electrode 11G may be grounded. The SAW 70 is generated between the first reference electrode 11G and the first signal electrode 11A. The interval between the first reference electrode 11G and the first signal electrode 11A is denoted by W1. In the range of the length denoted by W1, the SAW 70 has an energy that is larger than that in the other range.

The second IDT electrode 12 includes a second reference electrode 12G and a second signal electrode 12A to which voltage is applied. The second reference electrode 12G and the second signal electrode 12A are positioned to face each other on the substrate surface 10a. The sensor device 1 detects an electric signal generated by the SAW 70 that has propagated, by using the second reference electrode 12G and the second signal electrode 12A. The second reference electrode 12G may be grounded. The SAW 70 propagates between the second reference electrode 12G and the second signal electrode 12A. The interval between the second reference electrode 12G and the second signal electrode 12A is denoted by W2. The SAW 70 that has propagated in the range of the length denoted by W2 generates a larger electric signal in the second IDT electrode 12 than the SAW 70 that has propagated in the other range. That is, the second IDT electrode 12 can detect the SAW 70 efficiently in the range denoted by W2.

The waveguide 20 is formed as a film, for example. The planar shape of the waveguide 20 may be, for example, a square, a rectangle, a parallelogram, a rhombate, or the like. Note that the planar shape of the waveguide 20 is not limited to these examples as long as a sufficient amount of the reactive substance can be immobilized. In an embodiment, the planar shape of the waveguide 20 is a square.

On a side surface of the waveguide 20, the side surface facing the first IDT electrode 11, the upper end of the side surface may be positioned in an inner direction of the waveguide 20 than the lower end of the side surface. In addition, the side surface of the waveguide 20, the side surface facing the first IDT electrode 11, may be tilted. On a side surface of the waveguide 20, the side surface facing the second IDT electrode 12, the upper end of the side surface may be positioned in an inner direction of the waveguide 20 than the lower end of the side surface. In addition, the side surface of the waveguide 20, the side surface facing the second IDT electrode 12, may be tilted. The upper surface of the waveguide 20 may be smaller than the lower surface of the waveguide 20. In this case, all side surfaces of the waveguide 20 may be tilted. In addition, when a side surface is tilted, a side-surface region may be smaller than an upper-surface region in a top view of the waveguide 20.

The waveguide 20 is positioned on the substrate surface 10a and between the first IDT electrode 11 and the second IDT electrode 12. In an embodiment, the distance between a side of the waveguide 20 facing the first IDT electrode 11 and a side of the first IDT electrode 11 facing the waveguide 20 is constant. That is, the sides are in parallel to each other. In addition, in an embodiment, the distance between a side of the waveguide 20 facing the second IDT electrode 12 and a side of the second IDT electrode 12 facing the waveguide 20 is constant. That is, the sides are in parallel to each other.

Note that the distance between the side of the waveguide 20 facing the first IDT electrode 11 and the side of the first IDT electrode 11 facing the waveguide 20, and the distance between the side of the waveguide 20 facing the second IDT electrode 12 and the side of the second IDT electrode 12 facing the waveguide 20 is may be different from each other.

The waveguide 20 and at least one of the first reference electrode 11G and the second reference electrode 12G may be formed as a single unit. That is, the waveguide 20 may be connected to at least one of the first reference electrode 11G and the second reference electrode 12G. The potential of the waveguide 20 may be equal to the potential of at least one of the first reference electrode 11G and the second reference electrode 12G. The potential of the waveguide 20 may be floating.

If the waveguide 20 and the first reference electrode 11G and the second reference electrode 12G are formed as a single unit, the waveguide 20 is formed of the same material as that of the first reference electrode 11G and the second reference electrode 12G. In addition, if the waveguide 20 is formed as a different unit from the first reference electrode 11G and the second reference electrode 12G, the waveguide 20 may be formed of the same material as or a different material from that of the first reference electrode 11G and the second reference electrode 12G.

The waveguide 20 has a surface 20a on a side opposite to a side facing the substrate surface 10a. For example, the antibodies 51 may be immobilized on the surface 20a. The waveguide 20 may include the substrate-side close-contact layer 15 between the waveguide 20 and the substrate surface 10a. The substrate-side close-contact layer 15 of the waveguide 20 may be formed as a single unit with or a different unit from the substrate-side close-contact layer 15 of the first IDT electrode 11 and the second IDT electrode 12.

The protective film 30 covers the substrate surface 10a, the first IDT electrode 11, and the second IDT electrode 12. The protective film 30 may be formed of a TEOS oxide film. The TEOS oxide film is a silicon oxide film deposited by a plasma CVD (Chemical Vapor Deposition) using tetraethoxysilane as a material gas. Note that the protective film 30 is not limited to the above example as long as the material has an insulating property.

In an embodiment, a side wall 30a of the protective film 30 may intersect with the substrate surface 10a and may define the opening of the protective film 30. That is, the substrate surface 10a may have a region that is not covered with the protective film 30. In an embodiment, the waveguide 20 is positioned in the opening of the protective film 30. That is, the protective film 30 does not cover the surface 20a of the waveguide 20.

The sensor device 1 desirably detects a change in the state of the vicinity of the surface 20a of the waveguide 20 with high accuracy. The SAW 70 propagates through a region including the vicinity of the surface 20a of the waveguide 20. The more the energy of the SAW 70 propagating through the waveguide 20 is distributed in the vicinity of the surface 20a, the more influenced the SAW 70 is from the state of the vicinity of the surface 20a of the waveguide 20. Thus, a correlation between the change in the propagation characteristics of the SAW 70 and the change in the state of the vicinity of the surface 20a of the waveguide 20 becomes strong.

The energy of the SAW 70 may concentrate to the vicinity of the surface of the waveguide 20. The width of the waveguide 20 in the direction intersecting with the direction in which the SAW 70 propagates is denoted by W3 in FIG. 2. W3 may be longer than or equal to W1 and W2. Thus, the surface acoustic wave 70 may efficiently propagate from the first IDT electrode 11 to the vicinity of the surface of the waveguide 20.

If W3 is shorter than W1 and W2, in the energy of the SAW 70 that propagates from the first IDT electrode 11 to the second IDT electrode 12, the proportion of the energy of the SAW 70 that propagates through the waveguide 20 decreases. Thus, the detection sensitivity of the sensor device 1 decreases. On the other hand, by W3 being longer than W1 and W2, the proportion of the energy of the SAW 70 that propagates through the waveguide 20 increases. Thus, the detection sensitivity of the sensor device 1 may be improved.

Each of the first reference electrode 11G and the first signal electrode 11A of the first IDT electrode 11 includes a first common electrode 11Y and a plurality of first electrode fingers 11X. In a plan view, the first common electrodes 11Y extend in one direction (in the present disclosure, the direction in which the SAW 70 propagates or the direction in which the first IDT electrode and the second IDT electrode are arranged in a juxtaposed manner), and the plurality of first electrode fingers 11X extend from the first common electrodes 11Y in a direction intersecting with the one direction. The first common electrodes 11Y are a pair of electrodes facing each other. In addition, the first electrode fingers 11X are an electrode part that branches off and protrudes from the first common electrode 11Y of the first reference electrode 11G and the first common electrode 11Y of the first signal electrode 11A. The first electrode fingers 11X of the first reference electrode 11G protrude toward the first common electrode 11Y of the first signal electrode 11A, and the first electrode fingers 11X of the first signal electrode 11A protrude toward the first common electrode 11Y of the first reference electrode 11G. In addition, each of the first electrode fingers 11X protrudes in a direction that goes straight to the direction in which the SAW 70 propagates. Furthermore, the first electrode fingers 11X of the first reference electrode 11G and the first electrode fingers 11X of the first signal electrode 11A are arranged in a juxtaposed manner in the one direction.

The planar shape of the first common electrode 11Y and the first electrode fingers 11X of the first reference electrode 11G, and of the first common electrode 11Y and the first electrode fingers 11X of the first signal electrode 11A, may be, for example, a square, a rectangle, or the like. Note that the shape of the first common electrodes 11Y and the first electrode fingers 11X is not limited to this as long as the SAW 70 can be transmitted. In an embodiment, the planar shape of the first common electrode 11Y and the first electrode fingers 11X of the first reference electrode 11G, and of the first common electrode 11Y and the first electrode fingers 11X of the first signal electrode 11A, is a rectangle.

A sectional shape of the first common electrode 11Y and the first electrode fingers 11X of the first reference electrode 11G, and of the first common electrode 11Y and the first electrode fingers 11X of the first signal electrode 11A, may be, for example, a square, a rectangle, a trapezoid, or the like. Note that the shape of the first common electrodes 11Y and the first electrode fingers 11X is not limited to this as long as the SAW 70 can be transmitted. In an embodiment, the sectional shape of the first common electrode 11Y and the first electrode fingers 11X of the first reference electrode 11G, and of the first common electrode 11Y and the first electrode fingers 11X of the first signal electrode 11A, is a rectangle. Note that side surfaces of the pair of first common electrodes 11Y, the side surfaces facing each other, may be tilted in an inner direction such that the distance between the pair of first common electrodes 11Y increases. In addition, side surfaces of the plurality of first electrode fingers 11X, the side surfaces facing each other, may be tilted in an inner direction such that the distance between the plurality of first electrode fingers 11X increases. In addition, a side surface of a first electrode finger 11X facing the waveguide 20, the side surface facing the waveguide 20, may be tilted in an inner direction such that the distance between the first electrode finger 11X and the waveguide 20 increases.

In an embodiment, the first electrode fingers 11X of the first reference electrode 11G and the first electrode fingers 11X of the first signal electrode 11A are alternately positioned two by two in a direction from the waveguide 20 toward the first IDT electrode 11. Thus, since multiple reflection between the electrodes is reduced, the sensor device 1 can reduce amplitude ripple and group delay ripple. That is, the sensor device 1 can improve the detection accuracy. Note that, alternatively, the first electrode fingers 11X of the first reference electrode 11G and the first electrode fingers 11X of the first signal electrode 11A may be alternately positioned one by one. In this case, each IDT electrode can be formed simply.

A pair (first pair) of two first electrode fingers 11X of the first reference electrode 11G and two first electrode fingers 11X of the first signal electrode 11A is arranged in a juxtaposed manner in the one direction at a first pitch P1. The first pitch P1 corresponds to a repetition cycle of each of the two first electrode fingers 11X of the first reference electrode 11G and the two first electrode fingers 11X of the first signal electrode 11A. The number of first pairs is not limited to one and may be two or more.

A half pitch of the first pitch P1 is referred to as a first half pitch HP1. The first half pitch HP1 corresponds to an interval in the one direction from an end of the initial one of the first electrode fingers 11X of the first reference electrode 11G to an end of the initial one of the first electrode fingers 11X of the first signal electrode 11A in the first pair. The first half pitch HP1 is also referred to as a predetermined interval.

As described above, the first IDT electrode 11 generates the SAW 70 on the surface of the substrate 10 on the basis of an electric signal that is input to the first reference electrode 11G and the first signal electrode 11A. The wavelength of the SAW 70 generated in the first IDT electrode 11 corresponds to the first pitch P1.

Each of the second reference electrode 12G and the second signal electrode 12A of the second IDT electrode 12 includes a second common electrode 12Y and a plurality of second electrode fingers 12X. In a plan view, the second common electrodes 12Y extend in the one direction (in the present disclosure, the direction in which the SAW 70 propagates or the direction in which the first IDT electrode and the second IDT electrode are arranged in a juxtaposed manner), and the plurality of second electrode fingers 12X extend from the second common electrodes 12Y in the direction intersecting with the one direction. The second common electrodes 12Y are a pair of electrodes facing each other. The second electrode fingers 12X are an electrode part that branches off and protrudes from the second common electrode 12Y of the second reference electrode 12G and the second common electrode 12Y of the second signal electrode 12A. The second electrode fingers 12X of the second reference electrode 12G protrude toward the second common electrode 12Y of the second signal electrode 12A, and the second electrode fingers 12X of the second signal electrode 12A protrude toward the second common electrode 12Y of the second reference electrode 12G. In addition, each of the second electrode fingers 12X protrudes in the direction that goes straight to the direction in which the SAW 70 propagates. Furthermore, the second electrode fingers 12X of the second reference electrode 12G and the second electrode fingers 12X of the second signal electrode 12A are arranged in the juxtaposed manner in the one direction.

The planar shape of the second common electrode 12Y and the second electrode fingers 12X of the second reference electrode 12G, and of the second common electrode 12Y and the second electrode fingers 12X of the second signal electrode 12A, may be, for example, a square, a rectangle, or the like. Note that the shape of the second electrode fingers 12X is not limited to this as long as the SAW 70 can be received. In an embodiment, the planar shape of the second electrode fingers 12X of the second reference electrode 12G, and of the second electrode fingers 12X of the second signal electrode 12A, is a rectangle.

A sectional shape of the second common electrode 12Y and the second electrode fingers 12X of the second reference electrode 12G, and of the second common electrode 12Y and the second electrode fingers 12X of the second signal electrode 12A, may be, for example, a square, a rectangle, a trapezoid, or the like. Note that the shape of the second common electrodes 12Y and the second electrode fingers 12X is not limited to this as long as the SAW 70 can be transmitted. In an embodiment, the sectional shape of the second common electrode 12Y and the second electrode fingers 12X of the second reference electrode 12G, and of the first common electrode 11Y and the second electrode fingers 12X of the second signal electrode 12A, is a rectangle. Note that side surfaces of the pair of second common electrodes 12Y, the side surfaces facing each other, may be tilted in an inner direction such that the distance between the pair of second common electrodes 12Y increases. In addition, side surfaces of the plurality of second electrode fingers 12X, the side surfaces facing each other, may be tilted in an inner direction such that the distance between the plurality of second electrode fingers 12X increases. In addition, a side surface of a second electrode finger 12X facing the waveguide 20, the side surface facing the waveguide 20, may be tilted in an inner direction such that the distance between the second electrode finger 12X and the waveguide 20 increases.

In an embodiment, the second electrode fingers 12X of the second reference electrode 12G and the second electrode fingers 12X of the second signal electrode 12A are alternately positioned two by two in a direction from the waveguide 20 toward the second IDT electrode 12. Note that, alternatively, the second electrode fingers 12X of the second reference electrode 12G and the second electrode fingers 12X of the second signal electrode 12A may be alternately positioned one by one.

A pair (second pair) of two second electrode fingers 12X of the second reference electrode 12G and two second electrode fingers 12X of the second signal electrode 12A is arranged in a juxtaposed manner in the one direction at a second pitch P2. The second pitch P2 corresponds to a repetition cycle of each of the two second electrode fingers 12X of the second reference electrode 12G and the two second electrode fingers 12X of the second signal electrode 12A. The number of second pairs is not limited to one and may be two or more.

A half pitch of the second pitch P2 is referred to as a second half pitch HP2. The second half pitch HP2 corresponds to an interval in the one direction from an end of the initial one of the second electrode fingers 12X of the second reference electrode 12G to an end of the initial one of the second electrode fingers 12X of the second signal electrode 12A in the second pair.

As described above, the second IDT electrode 12 outputs the electric signal based on the SAW 70 that has propagated from the first IDT electrode 11 through the waveguide 20 to the second reference electrode 12G and the second signal electrode 12A. The closer the wavelength of the SAW 70 is to the second pitch P2, the higher the efficiency is at which the second IDT electrode 12 converts the SAW 70 into the electric signal. In other words, the smaller the difference between the first pitch P1 and the second pitch P2 is, the higher the efficiency is at which the second IDT electrode 12 converts the SAW 70 into the electric signal. In an embodiment, the sensor device 1 is configured such that the first pitch P1 and the second pitch P2 correspond to each other.

The SAW 70 generated in the first IDT electrode 11 propagates to the waveguide 20. The distance between an end of the first IDT electrode 11 on the waveguide 20 side and an end of the waveguide 20 on the first IDT electrode 11 side is denoted by D1. In an embodiment, the first IDT electrode 11 is configured such that the first electrode fingers 11X of the first reference electrode 11G are positioned on the waveguide 20 side. That is, a first electrode finger 11X that faces or is adjacent to the waveguide 20 may be a first electrode finger 11X of the first reference electrode 11G. Thus, generation of direct waves serving as noise can be reduced. That is, the sensor device 1 can improve the detection accuracy. In this case, the end of the first IDT electrode 11 on the waveguide 20 side corresponds to the end of the first electrode fingers 11X of the first reference electrode 11G on the waveguide 20 side. If the first reference electrode 11G and the waveguide 20 are connected to each other, D1 is 0.

The first IDT electrode 11 may also be configured such that the first electrode fingers 11X of the first signal electrode 11A are positioned on the waveguide 20 side. That is, a first electrode finger 11X that faces or is adjacent to the waveguide 20 may be a first electrode finger 11X of the first signal electrode 11A. Thus, since the SAW 70 is generated from a position close to the waveguide 20 compared with a case where the first electrode fingers 11X of the first reference electrode 11G are positioned on the waveguide 20 side, the propagation distance of the SAW 70 can be made shorter. That is, since attenuation of the SAW 70 can be reduced, the sensor device 1 can improve the detection accuracy. In this case, the end of the first IDT electrode 11 on the waveguide 20 side corresponds to the end of the first electrode fingers 11X of the first signal electrode 11A on the waveguide 20 side. If the first signal electrode 11A and the waveguide 20 are connected to each other, D1 is 0.

The SAW 70 propagates from the waveguide 20 to the second IDT electrode 12. The distance between an end of the second IDT electrode 12 on the waveguide 20 side and an end of the waveguide 20 on the second IDT electrode 12 side is denoted by D2. In FIG. 2, the second IDT electrode 12 is configured such that the second reference electrode 12G are positioned on the waveguide 20 side. That is, a second electrode finger 12X that faces or is adjacent to the waveguide 20 may be a second electrode finger 12X of the second reference electrode 12G. In this case, the end of the second IDT electrode 12 on the waveguide 20 side corresponds to the end of the second reference electrode 12G on the waveguide 20 side. If the second reference electrode 12G and the waveguide 20 are connected to each other, D2 is 0.

The second IDT electrode 12 may also be configured such that the second signal electrode 12A is positioned on the waveguide 20 side. That is, a second electrode finger 12X that faces or is adjacent to the waveguide 20 may be a second electrode finger 12X of the second signal electrode 12A. In this case, the end of the second IDT electrode 12 on the waveguide 20 side corresponds to the end of the second signal electrode 12A on the waveguide 20 side. If the second signal electrode 12A and the waveguide 20 are connected to each other, D2 is 0.

The sensor device 1 according to an embodiment includes the substrate 10 having the substrate surface 10a, the first IDT electrode, the second IDT electrode, and the waveguide 20. The first IDT electrode and the second IDT electrode are positioned on the substrate surface 10a. The waveguide 20 is positioned on the substrate surface 10a and between the first IDT electrode and the second IDT electrode. At least one of the first IDT electrode and the second IDT electrode includes a reference electrode and a signal electrode each including a plurality of electrode fingers, the plurality of electrode fingers being arranged in a juxtaposed manner in the one direction. The distance between the at least one of the first IDT electrode and the second IDT electrode and the waveguide 20 is shorter than an interval between the reference electrode and the signal electrode in the one direction.

Here, in an elastic wave sensor of the related art, part of the surface acoustic wave 70 diffuses inside the substrate 10 and becomes an unnecessary elastic wave whose propagation velocity does not change on the basis of the detection target. This unnecessary elastic wave is also referred to as a bulk wave.

The bulk wave propagates while receiving various effects inside the substrate 10. For example, the bulk wave may receive effects of random phenomena such as thermal vibration of a crystal lattice and a stress inside the crystal. That is, the propagation characteristics of the bulk wave may change randomly. On the other hand, the surface acoustic wave 70 is unlikely to receive effects of random phenomena that occur inside the substrate 10. Thus, in the sensor device 1 according to an embodiment, when the SAW 70 propagates through the waveguide 20 to the second IDT electrode 12, the propagation velocity of the SAW 70 may change in accordance with the state of the surface 20a of the waveguide 20 without receiving effects of the state of the inside of the substrate 10.

Figure 4:
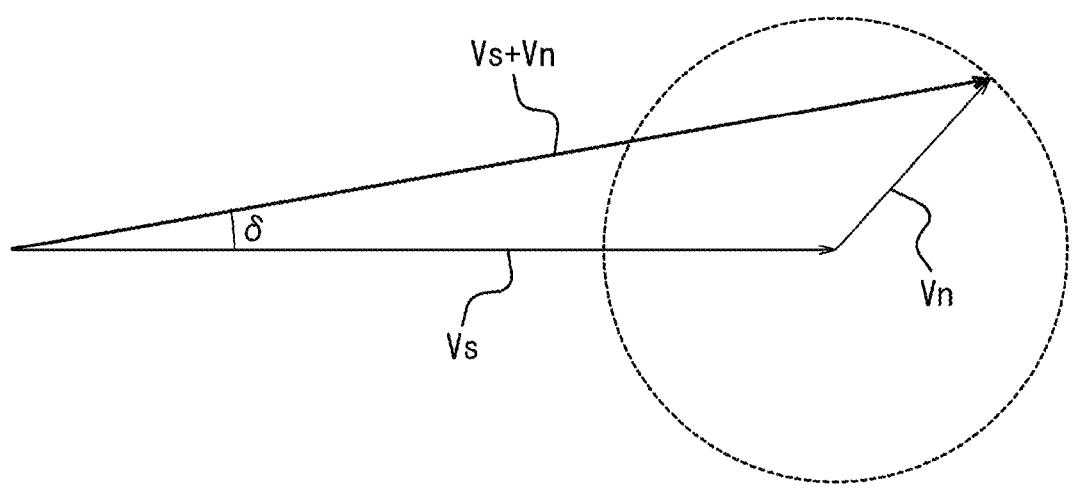
FIG. 4 is a schematic diagram illustrating an example of a composite wave of a SAW and a bulk wave.

The SAW 70 and the bulk wave may each be indicated by a vector as illustrated in FIG. 4. A vector Vs indicates the phase and amplitude of the SAW 70. A vector Vn indicates the phase and amplitude of the bulk wave. The circle illustrated by the broken line indicates that the phase of the bulk wave can be a value from $-\pi$ to $+\pi$. A vector Vs+Vn is a composite vector of Vs and Vn and indicates the phase and amplitude of a composite wave of the SAW 70 and the bulk wave. The angle between the vector Vn and the vector Vs+Vn corresponds to a phase difference between the SAW 70 and the composite wave and is denoted by δ. As the vector Vn is longer, δ varies more greatly. The length of the vector Vn corresponds to the magnitude of the amplitude of the bulk wave, that is, the magnitude of the energy of the bulk wave. Thus, as the energy of the bulk wave increases, δ indicating the phase difference of the composite wave with respect to the SAW 70 varies more greatly. In the example in FIG. 4, when a possible maximum of δ is denoted by δmax, $\sin(\delta max)=|Vn|/|Vs|$ is satisfied.

The second IDT electrode 12 can detect the bulk wave that has propagated inside the substrate 10 along with the SAW 70 that has propagated on the surface 20a of the waveguide 20 and the substrate surface 10a. That is, the second IDT electrode 12 can output an electric signal corresponding to the composite wave of the SAW 70 and the bulk wave. The bulk wave receives random effects while propagating inside the substrate 10 and does not reflect a change in the state of the surface 20a of the waveguide 20. Thus, in the electric signal output by the second IDT electrode 12, a component based on the bulk wave becomes a noise component. That is, the result of detection of the change in the state of the surface 20a of the waveguide 20 based on the phase of the electric signal output by the second IDT electrode 12 may include the noise component based on the bulk wave. Thus, as the energy to be converted into the bulk wave in the energy of the SAW 70 is larger, the detection error of the change in the state of the surface 20a of the waveguide 20 increases. In other words, as the energy to be converted into the bulk wave in the energy of the SAW 70 is smaller, the detection error of the change in the state of the surface 20a of the waveguide 20 decreases.

As described above, the sensor device 1 can increase the detection accuracy of the change in the state of the surface 20a of the waveguide 20 by reducing the proportion of the energy to be converted into the bulk wave. As the distance for which the SAW 70 propagates on the substrate surface 10a is shorter, the proportion of the energy to be converted into the energy of the bulk wave in the energy of the SAW 70 decreases. The distance for which the SAW 70 propagates on the substrate surface 10a corresponds to D1 and D2. That is, as D1 and D2 are shorter, the energy of the SAW 70 is more unlikely to be converted into the bulk wave. That is, the sensor device 1 according to the present disclosure can improve the detection sensitivity.

For example, the sensor device 1 according to an embodiment may be configured such that at least one of D1 and D2 is 0. Thus, the energy of the SAW 70 is unlikely to be converted into the bulk wave. As a result, the detection accuracy of the change in the state of the surface 20a of the waveguide 20 can be improved.

In addition, in a case where the configuration is made such that D1 is 0, alignment between the first IDT electrode 11 and the waveguide 20 is unnecessary. In a case where the configuration is made such that D1 is 0, alignment between the second IDT electrode 12 and the waveguide 20 is unnecessary. In these cases, sensitivity variation due to the alignment are not generated. As a result, the detection accuracy of the sensor device 1 is improved.

For example, the sensor device 1 may be configured such that D1 is shorter than HP1 and is longer than 0. That is, the sensor device 1 may be configured such that the first IDT electrode 11 and the waveguide 20 are different units. In this case, as compared with a case where the first IDT electrode 11 and the waveguide 20 are configured as a single unit, the sensor device 1 can reduce the generation of the direct wave.

In addition, for example, the sensor device 1 may be configured such that D2 is shorter than HP2 and is longer than 0. That is, the second IDT electrode 12 and the waveguide 20 may be formed as different units. In this case, as compared with a case where the second IDT electrode 12 and the waveguide 20 are configured as a single unit, the second IDT electrode 12 is likely to be excited, and thus, the sensor device 1 can improve the reception sensitivity of the SAW 70.

As described above, the wavelength of the SAW 70 is determined on the basis of the pitch of the first IDT electrode 11 and the second IDT electrode 12. The SAW 70 propagates as a transverse wave having an amplitude in the in-plane direction or the normal direction of the substrate surface 10a. The SAW 70 as a transverse wave has crests and troughs that alternately proceed. The energy of the SAW 70 propagates in the traveling direction as the crests and the troughs proceed. The crests and the troughs of the SAW 70 store the energy of the SAW 70 as elastic energy. The energy stored as a crest is converted into energy for forming the coming trough. The energy stored as a trough is converted into energy for forming the coming crest.

The propagation state of the SAW 70 that propagates along the substrate 10 can be calculated by simulation. By simulation, the amplitude of the SAW 70 in a case where the SAW 70 generated in the first IDT electrode 11 travels toward the waveguide 20 is calculated. The simulation is executed by using D1 and D2 as variables. In the setting of the simulation, the substrate 10 is quartz, and the first IDT electrode 11, the second IDT electrode 12, and the waveguide 20 are Au. The simulation results are illustrated in FIGS. 5A, 5B, and 5C in which the D1 side of the substrate 10 is enlarged and in FIGS. 6A, 6B, and 6C in which the D2 side of the substrate 10 is enlarged.

Figure 5A:
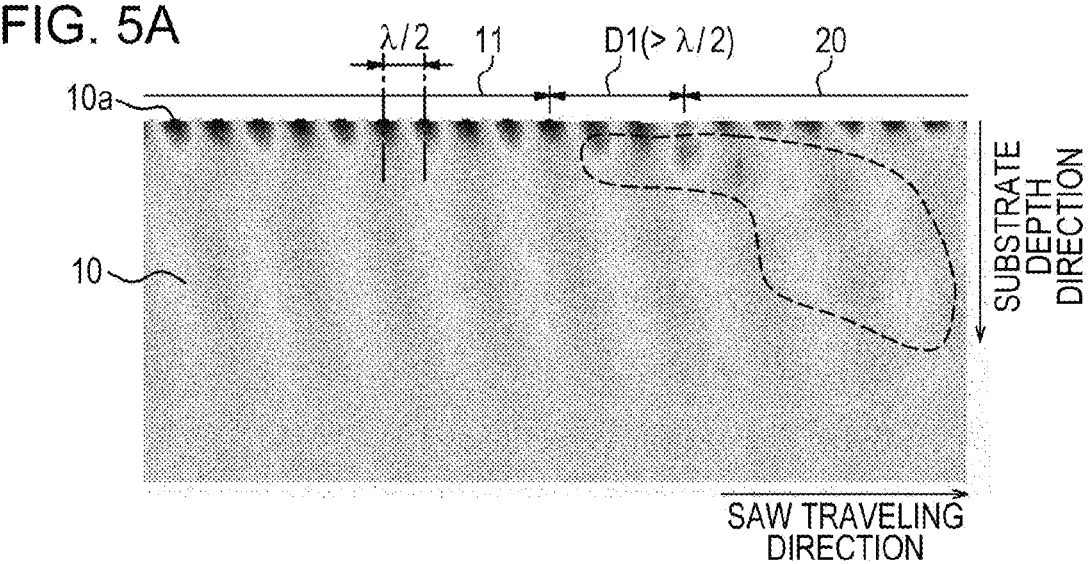
FIG. 5A illustrates a simulation result indicating a propagation state of the SAW in a case where a distance between a first IDT electrode and a waveguide is longer than ½ of the wavelength of the SAW.
Figure 5B:
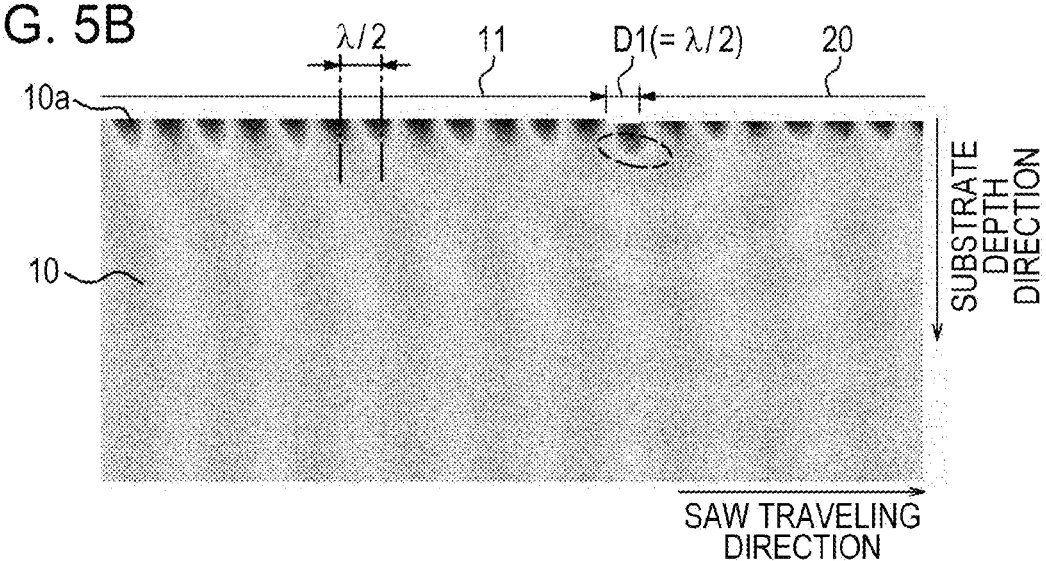
FIG. 5B illustrates a simulation result indicating a propagation state of the SAW in a case where the distance between the first IDT electrode and the waveguide is equal to ½ of the wavelength of the SAW.
Figure 5C:
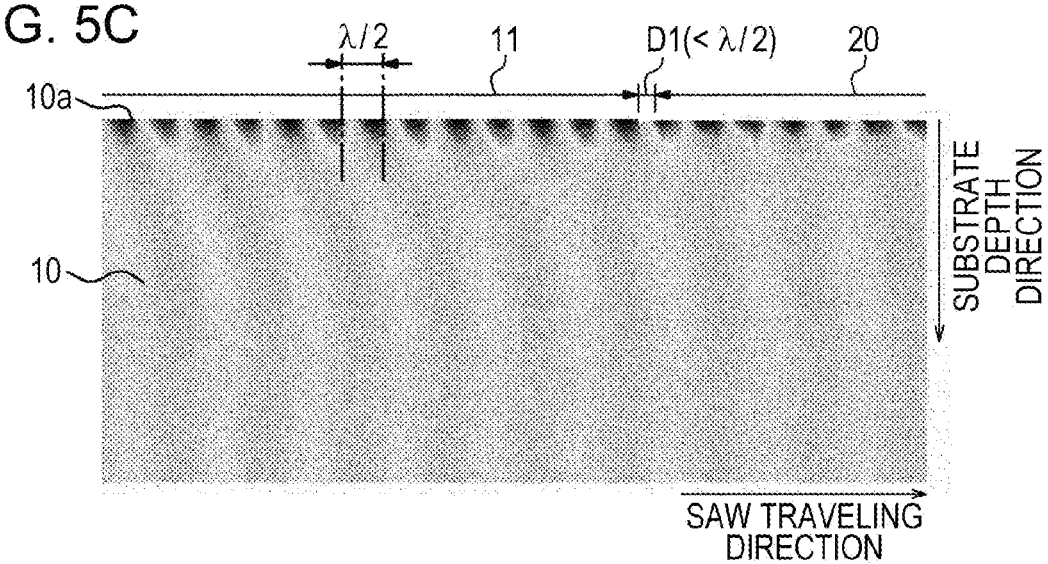
FIG. 5C illustrates a simulation result indicating a propagation state of the SAW in a case where the distance between the first IDT electrode and the waveguide is shorter than ½ of the wavelength of the SAW.

FIGS. 5A, 5B, and 5C illustrate the simulation results regarding the propagation of the SAW 70 on the D1 side. FIG. 5A is a simulation result in a case (case 1) where D1>$\lambda/2$ is satisfied. FIG. 5B is a simulation result in a case (case 2) where D1=$\lambda/2$ is satisfied. FIG. 5C is a simulation result in a case (case 3) where D1<$\lambda/2$ is satisfied.

FIGS. 5A, 5B, and 5C illustrate sections of the substrate 10 in the propagation direction of the SAW 70. In addition, the amplitudes of the SAW 70 and the bulk wave are illustrated in grayscale. In each part of the sections, in a part where the color is closer to black (darker), the amplitude of the SAW 70 or the bulk wave is larger, and the elastic energy is larger. In a part where the color is closer to white or gray (lighter), the amplitude of the SAW 70 or the bulk wave is smaller, and the elastic energy is smaller. The first IDT electrode 11 and the waveguide 20 are positioned with the interval denoted by D1 therebetween. The traveling direction of the SAW 70 is the direction from the first IDT electrode 11 toward the waveguide 20. In the simulation, the wavelength ($\lambda$) of the SAW 70 is set to 11.52 µm, and D2 is longer than $\lambda/2$.

In FIG. 5A, D1>$\lambda/2$ is satisfied. Specifically, D1 is set to 18 µm. Part of the SAW 70 that propagates from the first IDT electrode 11 to the waveguide 20 changes to the bulk wave that propagates in the depth direction of the substrate 10 while propagating on the substrate surface 10a positioned between the first IDT electrode 11 and the waveguide 20. In FIG. 5A, the state where part of the SAW 70 changes to the bulk wave is obviously confirmed in at least the inside of the part surrounded by the broken line. After the SAW 70 has reached the waveguide 20, the bulk wave still propagates inside the substrate 10.

In FIG. 5B, D1=$\lambda/2$ is satisfied. Specifically, D1 is set to 5.76 µm. Part of the SAW 70 that propagates from the first IDT electrode 11 to the waveguide 20 changes to the bulk wave that propagates in the depth direction of the substrate 10 while propagating on the substrate surface 10a positioned between the first IDT electrode 11 and the waveguide 20. In FIG. 5B, the state where part of the SAW 70 changes to the bulk wave is confirmed in at least the inside of the part surrounded by the broken line. However, the bulk wave changed from the SAW 70 is reduced compared with a case where D1>$\lambda/2$ is satisfied. The bulk wave radially propagates from the substrate surface 10a positioned between the first IDT electrode 11 and the waveguide 20 toward the inside of the substrate 10.

In FIG. 5C, D1<$\lambda/2$ is satisfied. Specifically, D1 is set to 2.2 µm. Almost no SAW 70 that propagates from the first IDT electrode 11 to the waveguide 20 diffuses in the depth direction of the substrate 10. In FIG. 5C, the state is confirmed where the bulk wave changed from the SAW 70 is further reduced compared with a case where D1=$\lambda/2$ is satisfied. That is, the generation of the bulk wave is further reduced in a case where D1<$\lambda/2$ is satisfied.

On the basis of the distribution of the SAW 70 and the bulk wave illustrated in FIGS. 5A, 5B, and 5C, the proportion of the energy of the SAW 70 propagating from the first IDT electrode 11 to the waveguide 20 converted into the bulk wave is the highest in case 1 and is the lowest in case 3. That is, the simulation results indicate that the proportion of the energy of the SAW 70 propagating from the first IDT electrode 11 to the waveguide 20 converted into the bulk wave decreases as D1 is shorter. Thus, the sensor device 1 according to an embodiment can reduce the sensitivity variation when D1<$\lambda/2$ is satisfied.

Figure 6A:
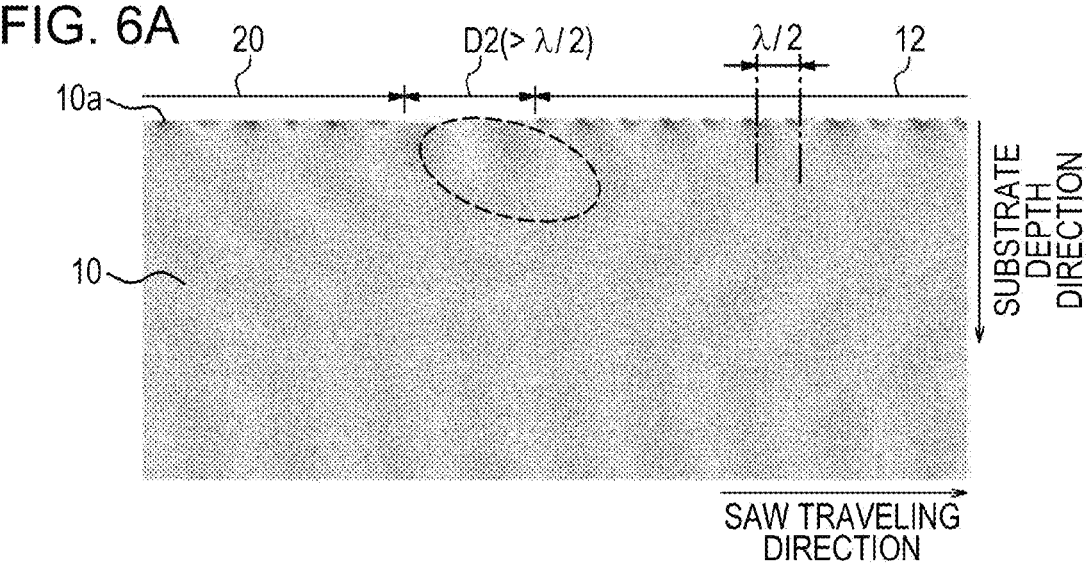
FIG. 6A illustrates a simulation result indicating a propagation state of the SAW in a case where a distance between a second IDT electrode and the waveguide is longer than ½ of the wavelength of the SAW.
Figure 6B:
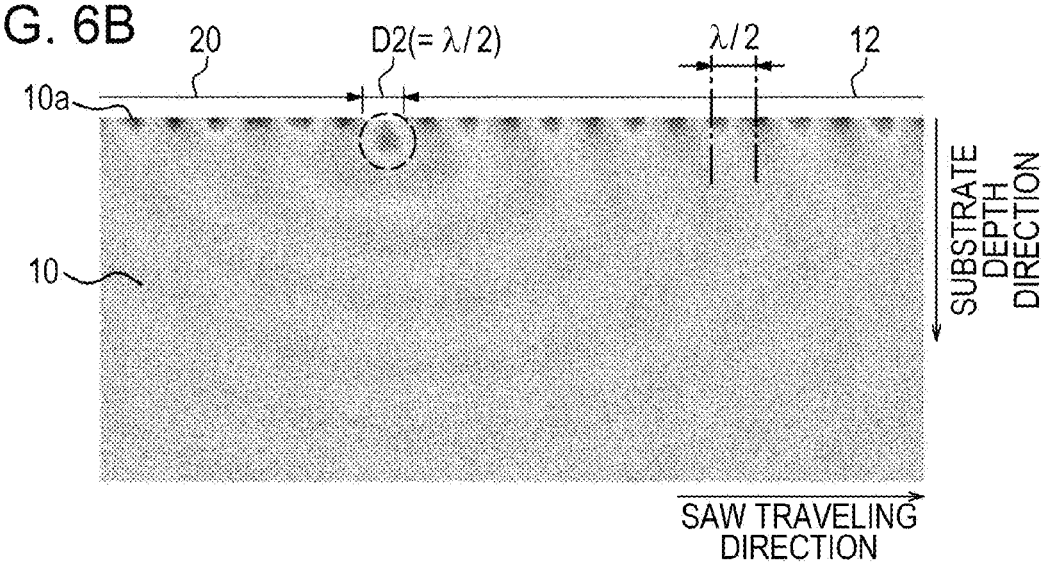
FIG. 6B illustrates a simulation result indicating a propagation state of the SAW in a case where the distance between the second IDT electrode and the waveguide is equal to ½ of the wavelength of the SAW.
Figure 6C:
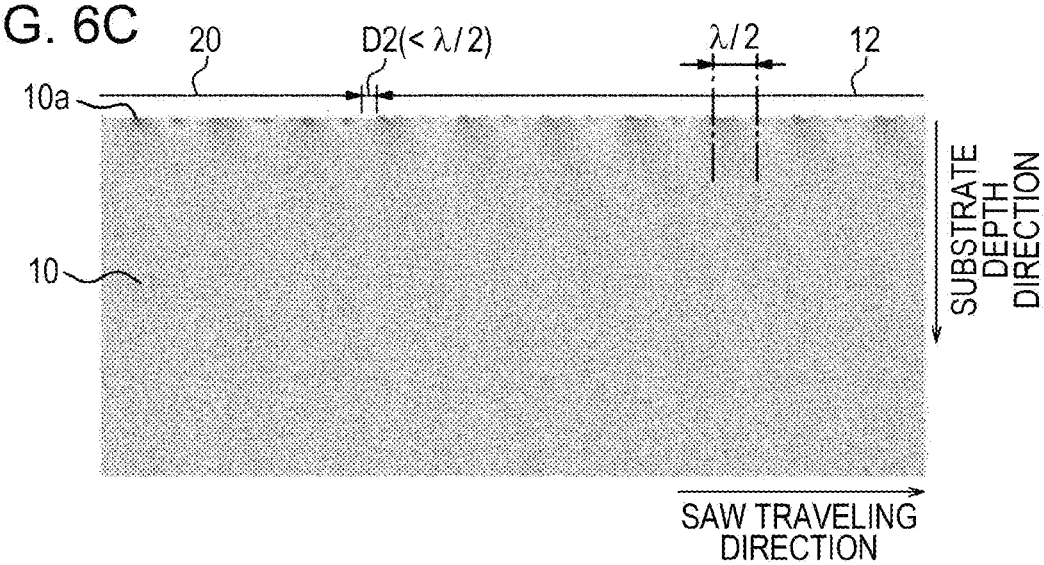
FIG. 6C illustrates a simulation result indicating a propagation state of the SAW in a case where the distance between the second IDT electrode and the waveguide is shorter than ½ of the wavelength of the SAW.

FIGS. 6A, 6B, and 6C illustrate the simulation results regarding the propagation of the SAW 70 on the D2 side. FIG. 6A is a simulation result in a case (case 4) where D2>$\lambda/2$ is satisfied. FIG. 6B is a simulation result in a case (case 5) where D2=$\lambda/2$ is satisfied. FIG. 6C is a simulation result in a case (case 6) where D2<$\lambda/2$ is satisfied.

FIGS. 6A, 6B, and 6C illustrate sections of the substrate 10 in the propagation direction of the SAW 70. In addition, the amplitudes of the SAW 70 and the bulk wave are illustrated in grayscale. The explanation regarding the display is substantially the same as that of FIGS. 5A, 5B, and 5C. The waveguide 20 and the second IDT electrode 12 are positioned with the interval denoted by D2 therebetween. The traveling direction of the SAW 70 is the direction from the waveguide 20 toward the second IDT electrode 12. In the simulation, the wavelength ($\lambda$) of the SAW 70 is set to 11.52 µm, and D1 is longer than $\lambda/2$.

In FIG. 6A, D2>$\lambda/2$ is satisfied. Specifically, D2 is set to 18 µm. Part of the SAW 70 that propagates from the waveguide 20 to the second IDT electrode 12 changes to the bulk wave that propagates in the depth direction of the substrate 10 while propagating on the substrate surface 10a positioned between the waveguide 20 and the second IDT electrode 12. In FIG. 6A, the state where part of the SAW 70 changes to the bulk wave is obviously confirmed in at least the inside of the part surrounded by the broken line. After the SAW 70 has reached the second IDT electrode 12, the bulk wave still propagates inside the substrate 10.

In FIG. 6B, D2=$\lambda/2$ is satisfied. Specifically, D2 is set to 5.76 µm. Part of the SAW 70 that propagates from the waveguide 20 to the second IDT electrode 12 changes to the bulk wave that propagates in the depth direction of the substrate 10 while propagating on the substrate surface 10a positioned between the waveguide 20 and the second IDT electrode 12. In FIG. 5B, the state where part of the SAW 70 changes to the bulk wave is confirmed in at least the inside of the part surrounded by the broken line. However, the bulk wave changed from the SAW 70 is reduced compared with a case where D2>$\lambda/2$ is satisfied. The bulk wave radially propagates from the substrate surface 10a positioned between the first IDT electrode 11 and the waveguide 20 toward the inside of the substrate 10.

In FIG. 6C, D2<$\lambda/2$ is satisfied. Specifically, D2 is set to 2.2 µm. Almost no SAW 70 that propagates from the waveguide 20 to the second IDT electrode 12 diffuses in the depth direction of the substrate 10. In FIG. 6C, the state is confirmed where the bulk wave changed from the SAW 70 is further reduced compared with a case where D1=$\lambda/2$ is satisfied. That is, the generation of the bulk wave is further reduced in a case where D2<$\lambda/2$ is satisfied.

On the basis of the distribution of the SAW 70 and the bulk wave illustrated in FIGS. 6A, 6B, and 6C, the proportion of the energy of the SAW 70 propagating from the waveguide 20 to the second IDT electrode 12 converted into the bulk wave is the highest in case 4 and is the lowest in case 6. That is, the simulation results indicate that the proportion of the energy of the SAW 70 propagating from the waveguide 20 to the second IDT electrode 12 converted into the bulk wave decreases as D2 is shorter. Thus, the sensor device 1 according to an embodiment can reduce the sensitivity variation when D2<λ/2 is satisfied.

As described above, the configuration in which the distance (D1) between the first IDT electrode 11 and the waveguide 20 and the distance (D2) between the waveguide 20 and the second IDT electrode 12 are made short has been described. According to this, it is indicated that the proportion of the energy of the SAW 70 propagating from the first IDT electrode 11 to the waveguide 20 converted into the bulk wave decreases as the D1 is shorter. In addition, it is indicated that the proportion of the energy of the SAW 70 propagating from the waveguide 20 to the second IDT electrode 12 converted into the bulk wave decreases as the D2 is shorter. Thus, the simulation results indicate that the proportion of the energy of the SAW 70 converted into the bulk wave decreases in the propagation path as D1 and D2 are shorter. Specifically, it is indicated that, when D1<λ/2 and D2<λ/2 are satisfied, the proportion of the energy of the SAW propagating from the first IDT electrode 11 to the waveguide 20 and from the waveguide 20 to the second IDT electrode 12 converted into the bulk wave decreases. Thus, the sensor device 1 according to an embodiment can reduce the sensitivity variation when D1<λ/2 and D2<λ/2 are satisfied.

Note that the simulation results illustrated in FIGS. 5A, 5B, and 5C and FIGS. 6A, 6B, and 6C illustrate sections of the substrate 10. That is, the sensor device 1 according to an embodiment can reduce the sensitivity variation when D1<λ/2 and D2<λ/2 are satisfied between at least part of the waveguide 20 and at least part of the first IDT electrode 11 or at least part of the second IDT electrode 12.

Example of Calculating Sensitivity Variation

An example of calculating the sensitivity variation of the sensor device 1 will be described. The sensitivity of the sensor device 1 indicates the sensitiveness of the change in the electric signal to the change in the phase of the SAW 70. When a plurality of sensor devices 1 with different sensitivities measure the same specimen 60, different detection results are obtained. Thus, a small sensitivity variation of the sensor device 1 means a small variation of the output obtained from a plurality of sensor devices 1 measuring the same specimen 60 and means high detection accuracy and stable detection results.

In a measurement example, the sensitivity variation is measured by using a difference in the viscosity of aqueous solutions.

As liquid to be dropped onto the surface 20a of the waveguide 20, pure water and a 20 wt % aqueous glycerin solution are used. The viscosity of the aqueous glycerin solution is determined on the basis of the concentration of glycerin. The viscosity of the 20 wt % aqueous glycerin solution is higher than the viscosity of pure water. Experiments were performed in the following procedure. Conditions of the experiments described below may be changed as appropriate.

Step 1: A measurer substituted liquid on the surface 20a of the waveguide 20 for pure water and measured the phase of the SAW 70. Measurement was performed after an elapse of two minutes from the substitution for pure water. The phase measured in Step 1 is denoted by θ1.

Step 2: The measurer substituted liquid on the surface 20a of the waveguide 20 for the 20 wt % aqueous glycerin solution and measured the phase of the SAW 70. Measurement was performed after an elapse of two minutes from the substitution of pure water for the aqueous glycerin solution. The phase measured in Step 2 is denoted by θ2.

Step 3: A difference between θ2 and θ1 was calculated as a sensitivity. The sensitivity is denoted by Δθ. Δθ=θ2−θ1 is satisfied.

Step 4: The measurer performed Steps 1 to 3 on a plurality of sensor devices 1 and measures Δθ a plurality of times.

Step 5: The measurer calculated an average (Ave) and a standard deviation (σ) of the plurality of measured values of Δθ and calculated the result of dividing the standard deviation by the average as a coefficient of variation representing the sensitivity variation. The coefficient of variation is also referred to as a CV (Coefficient of Variation). CV=σ/Ave is satisfied.

As the sensor device 1 on which the above procedure including Steps 1 to 5 was performed, the sensor device 1 in which some parameters for specifying the elements were varied was prepared. Among the parameters for specifying the elements of the sensor device 1, the wavelength (λ) of the SAW 70 and the thickness (h) of the waveguide 20 were fixed. Among the parameters for specifying the elements of the sensor device 1, the distance (D1) between the first IDT electrode 11 and the waveguide 20 and the distance (D2) between the second IDT electrode 12 and the waveguide 20 were varied. In the experiment of this measurement example, the sensor device 1 was configured such that D1 and D2 corresponded to each other. In this measurement example, D1 and D2 are collectively denoted as D. D is represented as a value standardized for the wavelength (λ) of the SAW 70. A plurality of sensor devices 1 having different values as D in the range from 0 to λ were prepared. By performing the above procedure of Steps 1 to 5 on each of the sensor devices 1, the sensitivity of the sensor device 1 was measured.

FIG. 7 illustrates an example of measured data of the coefficient of variation of the sensitivity of the sensor device 1. In the graph in FIG. 7, the horizontal axis represents the value of D/λ. The vertical axis represents the coefficient of variation (CV). The measured data illustrated in FIG. 7 was obtained under the following parameter setting. Note that h is the film thickness of the waveguide 20. In addition, D indicates each of D1 and D2 unless they are distinguished from each other in the following description.

λ=11.5 μm (P1=11.5 μm), h=110 nm, D/λ=0 to 1 (D=0 to λ)

The value of CV in the range of D from λ/2 to λ (D/λ is from 0.5 to 1) decreases so as to have a relationship of a linear function with respect to D as D is reduced from λ to λ/2, as indicated by the approximate line of the solid line. On the other hand, the value of CV in the range of D less than λ/2 (D/λ is less than 0.5) suddenly decreases to a value of about 1% indicated by the approximate line of the dot-dash line, deviated from the relationship of the linear function with respect to D indicated by the broken line. This result indicates that causes for increasing the sensitivity variation are reduced as D becomes less than the length of ½ of the wavelength of the SAW 70. That is, this result proves that the proportion of the energy of the SAW 70 converted into the bulk wave decreases as D becomes less than the length of ½ of the wavelength of the SAW 70.

As described above, the sensor device 1 according to this embodiment can reduce the sensitivity variation by being configured such that at least one of D1 and D2 becomes less than λ/2. As a result, the detection accuracy of the change in the state of the surface 20a of the waveguide 20 by the sensor device 1 is improved.

In addition, in a case where the first IDT electrode 11 or the second IDT electrode 12 and the waveguide 20 are formed as different units, the first IDT electrode 11 or the second IDT electrode 12 and the waveguide 20 may be formed together in one step or may be formed independently in two or more steps. By the first IDT electrode 11 or the second IDT electrode 12 and the waveguide 20 the being formed as different units, the degree of freedom of the layout of the elements of the sensor device 1 increases. For example, at a position facing the waveguide 20, either electrode of a reference electrode and a signal electrode may be provided.

<Method of Manufacturing SAW Sensor>

Hereinafter, a method of manufacturing the sensor device 1 will be described.

In a first step, the substrate-side close-contact layer 15, a metal layer 16 (not illustrated), and the protective-film-side close-contact layer 17 are formed on the substrate surface 10a of the substrate 10. In a second step, the first reference electrode 11G and the first signal electrode 11A, the second reference electrode 12G and the second signal electrode 12A, and the waveguide 20 are formed from the metal layer 16.

The first reference electrode 11G, the first signal electrode 11A, the second reference electrode 12G, the second signal electrode 12A, and the waveguide 20 may be formed by using any appropriate processing technology. For example, etching based on a mask having a desirable pattern may be used. The mask may be formed, for example, by photolithography. As the mask, a resist resin or the like may be used. The etching may include wet etching or dry etching. The wet etching may include a step of dissolving a material in an acid solution, an alkaline solution, or the like. The dry etching may include a step of removing a material by using plasma, such as RIE (Reactive Ion Etching) or sputter etching.

The first step and the second step may be replaced with a step of forming the first IDT electrode 11, the second IDT electrode 12, and the waveguide 20 in a patterned state on the substrate surface 10a. The step of forming these in a patterned state can be implemented, for example, by forming the substrate-side close-contact layer 15, the metal layer 16, and the protective-film-side close-contact layer 17 in a state of being covered with a metal hard mask, a resist resin mask, or the like.

The step of forming the waveguide 20 may be configured so as not to form the protective-film-side close-contact layer 17 on the surface 20a of the waveguide 20. The step of forming the waveguide 20 may be configured such that the protective-film-side close-contact layer 17 is formed on the surface 20a of the waveguide 20 and then the protective-film-side close-contact layer 17 is removed.

In the first step and the second step, the first IDT electrode 11, the second IDT electrode 12, and the waveguide 20 are simultaneously formed. A step of forming the first IDT electrode 11 and the second IDT electrode 12 and a step of forming the waveguide 20 may be divided as independent steps. When the steps are divided, whichever of the steps may be performed first. When the first IDT electrode 11, the second IDT electrode 12, and the waveguide 20 are simultaneously formed, the position of the waveguide 20 relative to the first IDT electrode 11 and the second IDT electrode 12 can be controlled with high accuracy. As a result, the accuracy of D1 and D2 can be improved, and the measurement accuracy can be improved.

In a third step, the protective film 30 for covering elements formed on the substrate surface 10a is formed. In a fourth step, a part of the protective film 30 is removed. As a result of removing the part of the protective film 30, an opening surrounded by the side wall 30a is formed in the protective film 30. The protective film 30 may be removed, for example, by etching based on a mask having a pattern of the opening. The etching may include any appropriate method such as dry etching or wet etching. The protective film 30 may be removed such that the first IDT electrode 11 and the second IDT electrode 12 remain covered. The protective film 30 may be removed so as to expose at least part of the surface 20a of the waveguide 20. It can be said that the surface 20a of the waveguide 20 is exposed in the opening of the protective film 30.

In a fifth step, a substance, such as the antibodies 51, aptamers, or enzymes, that reacts with a detection target is immobilized on the surface 20a of the waveguide 20. In an embodiment, it is assumed that the antibodies 51 (see FIG. 1) are immobilized on the surface 20a. When the waveguide 20 is formed of gold (Au), the antibodies 51 may be formed on the surface 20a on the basis of, for example, a gold thiol bond, which is a bond between gold (Au) and divalent sulfur (S). In this case, a polymer film is formed on the surface 20a, and the antibodies 51 may be bound to the polymer by amine coupling by using an appropriate condensation agent (such as EDC/NHS reagent) in the polymer. The antibodies 51 may be immobilized on the surface 20a by being bound to the polymer. The state of the surface 20a can exert an effect on immobilization of the antibodies 51. For example, a surface state such as the composition and the surface roughness of the surface 20a can exert an effect as to whether or not the antibodies 51 can be easily immobilized on the surface 20a. Note that it is possible to use, as the polymer, for example, polyethylene glycol, carboxymethyldextran, polyacrylic acid, polymethacrylic acid, polyhydroxyethyl methacrylic acid, polyacrylamide, polycarboxybetaine methacrylic acid, polybetain sulfonic acid, polymethacrylic acid ethyl phosphorylcholine, or polyhydroxypropyl acrylamide.

In a case where the protective-film-side close-contact layer 17 is formed on the surface 20a of the waveguide 20 and is removed, the protective-film-side close-contact layer 17 may be removed in the second step or may be removed in the fourth step. The surface 20a may be covered with another protective material other than the protective-film-side close-contact layer 17. The surface 20a may be covered with a protective material until immediately before the fifth step. By the surface 20a being protected until the fifth step, it becomes easier to control the state of the surface 20a. In a case where the waveguide 20 includes two or more layers, the layer constituting the surface 20a of the waveguide 20 may be formed after the opening of the protective film 30 is formed. As a result, it becomes easier to control the state of the surface 20a.

The sensor device 1 according to the embodiment may be manufactured by performing each of the aforementioned steps. The aforementioned steps are each an example. Any appropriate step may be added. Some of the steps may be omitted.

The figures illustrating embodiments of the present disclosure are schematic. Not all of the figures are to scale, for example.

Heretofore, embodiments of the present disclosure have been described on the basis of the drawings and examples.

Note that a person having ordinary skill in the art can easily perform various modifications and corrections on the basis of the present disclosure. Accordingly, note that these modifications and corrections are included in the scope of the present disclosure.

A case where detection is performed on the basis of the SAW 70 whose propagation velocity has changed by the weight added to the substrate 10 has been described in the above example. However, for example, the sensor device 1 may perform detection on the basis of the SAW 70 whose propagation velocity has changed by reduction in the weight added to the substrate 10.

For example, first, an analogue that is similar to the antigens 61 are immobilized in advance on the substrate 10. In this case, the analogue may have a binding affinity with the antibodies 51, but the binding affinity with the antibodies 51 is lower than that with the antigens 61, which is the detection target. Subsequently, a known amount of antibodies 51 is supplied to the substrate 10, and the analogue and the antibodies 51 form the complexes 52. Subsequently, the specimen 60 including the antigens 61, which is the detection target, is supplied to the substrate 10. In this case, since the antigens 61 have a higher binding affinity with the antibodies 51 than the analogue, the antibodies 51 are dissociated from the analogue and form the complexes 52 with the antigens 61. Thus, the weight added to the substrate 10 is reduced by the dissociated antibodies 51. The amount of the dissociated antibodies 51 corresponds to the amount of the detection target, and thus, the propagation velocity of the SAW 70 changes in accordance with the amount of the detection target. The sensor device 1 acquires the phase of the SAW 70 before and after supplement of the specimen 60 and calculates the phase difference. On the basis of the calculated phase difference, the detection target can be detected.

For example, it is possible to rearrange functions and the like included in each element without allowing logical contradiction, and it is possible to unite or divide a plurality of elements and the like.

A configuration in which the waveguide 20 is positioned between the first reference electrode 11G and the second reference electrode 12G has been described in the above example. However, the configuration of the sensor device 1 is not limited to this example. Specifically, the waveguide 20 may be positioned between electrodes of any of the following combinations: (1) the first reference electrode 11G and the second signal electrode 12A, (2) the first signal electrode 11A and the second reference electrode 12G, and (3) the first signal electrode 11A and the second signal electrode 12A. Note that in the combinations (1) to (3), the waveguide 20 may be a single unit with either one of the electrodes, but the waveguide 20 may not be a single unit with both of the electrodes.

In addition, a case where the waveguide 20 is formed of a single Au film has been described in the above example. However, the waveguide 20 may be formed of a plurality of metal films. For example, the waveguide 20 may be formed of two or more metal films including a plurality of metals, such as Au—Au, Au—Ti—Au. In this case, the end portion of the metal films contacting with the substrate surface 10a may be the end portion of each of D1 and D2 on the waveguide 20 side.

In the present disclosure, ordinal numbers such as "first" and "second" are identifiers for discriminating between the elements. In the present disclosure, regarding the elements that are discriminated by the ordinal numbers such as "first" and "second", the ordinal numbers may be replaced with each other. For example, the identifiers "first" and "second" of the first IDT electrode and the second IDT electrode may be replaced with each other. Replacement of the identifiers is performed simultaneously. Even after the replacement of identifiers, the elements are discriminated. The identifiers may be omitted. Elements from which the identifiers are omitted are discriminated by reference numerals. In the present disclosure, only the identifiers "first", "second", and the like should not be used for the interpretation of the order of the elements and as the basis for the presence of an identifier with a smaller number.

REFERENCE SIGNS LIST 1 sensor device
10 substrate
10a substrate surface
11 first IDT electrode (11A: first signal electrode, 11G: first reference electrode)
12 second IDT electrode (12A: second signal electrode, 12G: second reference electrode)
15 substrate-side close-contact layer
16 metal layer
17 protective-film-side close-contact layer
20 waveguide
20a surface
30 protective film
30a side wall
51 antibody
52 complex
60 specimen
61 antigen
70 SAW

The invention claimed is:

1. A sensor device comprising:
a substrate having a substrate surface;
a first IDT electrode and a second IDT electrode that are positioned on the substrate surface; and
a waveguide that is positioned on the substrate surface and between the first IDT electrode and the second IDT electrode,
wherein the first IDT electrode and the second IDT electrode includes a reference electrode and a signal electrode each including a plurality of electrode fingers, the plurality of electrode fingers being arranged in a juxtaposed manner in one direction,
wherein a distance between the at least one of the first IDT electrode and the second IDT electrode and the waveguide is shorter than an interval between the reference electrode and the signal electrode in the one direction, and
wherein the at least one of the first IDT electrode and the second IDT electrode is positioned away from the waveguide.

2. The sensor device according to claim 1,
wherein the first IDT electrode includes a first reference electrode and a first signal electrode each including a plurality of first electrode fingers, the plurality of first electrode fingers being arranged in a juxtaposed manner in the one direction,
wherein a distance between the first IDT electrode and the waveguide is shorter than an interval between the first reference electrode and the first signal electrode in the one direction,
wherein the second IDT electrode includes a second reference electrode and a second signal electrode each including a plurality of second electrode fingers, the plurality of second electrode fingers being arranged in a juxtaposed manner in the one direction, and wherein a distance between the second IDT electrode and the waveguide is shorter than an interval between the second reference electrode and the second signal electrode in the one direction.

3. The sensor device according to claim 1, wherein at least one of the first IDT electrode and the second IDT electrode is connected to the waveguide.

4. The sensor device according to claim 3, wherein the waveguide is connected to the reference electrode of the at least one of the first IDT electrode and the second IDT electrode.

5. The sensor device according to claim 3, wherein the waveguide is connected to the signal electrode of the first IDT electrode or the second IDT electrode.

6. The sensor device according to claim 1, wherein a width of the waveguide in a direction intersecting with the one direction is larger than a width of the first IDT electrode in the direction intersecting with the one direction.

7. The sensor device according to claim 1, wherein a width of the waveguide in the direction intersecting with the one direction is larger than a width of the second IDT electrode in the direction intersecting with the one direction.

8. The sensor device according to claim 1, wherein a first electrode finger facing the waveguide is a first electrode finger of the first reference electrode.

9. The sensor device according to claim 1, wherein a first electrode finger facing the waveguide is a first electrode finger of the first signal electrode.

10. The sensor device according to claim 1, wherein a second electrode finger facing the waveguide is a second electrode finger of the second reference electrode.

11. The sensor device according to claim 1, wherein a second electrode finger facing the waveguide is a second electrode finger of the second signal electrode.

12. The sensor device according to claim 1, wherein the waveguide is a metal film positioned on the substrate surface.

13. The sensor device according to claim 1, wherein the waveguide includes a metal material that is different from a metal material of the first IDT electrode and the second IDT electrode.

14. The sensor device according to claim 1, further comprising
a protective film provided on the first IDT electrode and the second IDT electrode.

15. The sensor device according to claim 14, wherein the protective film includes an opening in which the substrate surface is exposed, and
wherein the waveguide is positioned in the opening.

* * * * *